(12) United States Patent
Cavallaro et al.

(10) Patent No.: US 6,292,130 B1
(45) Date of Patent: Sep. 18, 2001

(54) SYSTEM FOR DETERMINING THE SPEED AND/OR TIMING OF AN OBJECT

(75) Inventors: Richard H. Cavallaro, Mountain View; Fred Judson Heinzmann, Los Altos; Stanley K. Honey, Palo Alto; Kenneth A. Milnes, Fremont; Marvin S. White, San Carlos, all of CA (US)

(73) Assignee: Sportvision, Inc., New York, NY (US)

( * ) Notice: Subject to any disclaimer, the term of this patent is extended or adjusted under 35 U.S.C. 154(b) by 0 days.

(21) Appl. No.: 09/289,166

(22) Filed: Apr. 9, 1999

(51) Int. Cl.$^7$ .................................................. G01S 13/50
(52) U.S. Cl. .............................. 342/104; 342/55; 473/151
(58) Field of Search .......................... 342/55, 104, 107, 342/109; 473/151, 219, 221, 222, 233, 257, 261

(56) References Cited

U.S. PATENT DOCUMENTS

| 4,146,230 | 3/1979 | Foster ................................ 273/186 R |
| 4,163,941 | 8/1979 | Linn, Jr. ................................ 324/178 |
| 4,254,956 | 3/1981 | Rusnak ................................ 273/186 R |
| 4,451,043 | 5/1984 | Ogawa et al. ........................... 273/186 R |
| 4,542,906 | 9/1985 | Takase et al. .......................... 273/185 R |
| 4,545,576 | * 10/1985 | Harris ..................................... 273/25 |
| 4,577,863 | 3/1986 | Ito et al. .................................. 273/26 |
| 5,082,263 | 1/1992 | Berger .................................... 273/29 |
| 5,092,602 | 3/1992 | Witler .................................... 473/199 |
| 5,138,322 | * 8/1992 | Nuttall ................................. 342/126 |
| 5,401,026 | 3/1995 | Eccher et al. ....................... 273/184 R |
| 5,609,534 | 3/1997 | Gebhardt ............................... 473/409 |
| 5,868,578 | * 2/1999 | Baum .................................... 434/247 |
| 5,912,700 | 6/1999 | Honey et al. ......................... 348/157 |
| 5,917,553 | 6/1999 | Honey et al. ......................... 348/578 |
| 5,926,780 | 7/1999 | Fox et al. .............................. 473/152 |
| 6,042,492 | * 3/2000 | Baum .................................... 473/453 |

FOREIGN PATENT DOCUMENTS

| 2104761 | 3/1994 | (CA) ............................. A61B/69/36 |
| 2110545 | * 6/1983 | (GB) . |

OTHER PUBLICATIONS

Dickson, G., "ESPN checks swings with Bat Track," Broadcasting and Cable, Jun. 1998.*

* cited by examiner

Primary Examiner—Ian J. Lobo
(74) Attorney, Agent, or Firm—Vierra, Magen Marcus Harmon & DeNiro LLP (57) ABSTRACT

A system is disclosed that can determine the speed of an object and report that speed in a format suitable for use on a television broadcast, a radio broadcast, the Internet or another medium. One example of a suitable use for the present invention includes determining the speed that a baseball player swings a bat. Another use of the present invention is to measure the speed of a moving ball. In one embodiment, the system includes a set of radars positioned behind and pointed toward the batter. Data from all of the radars is collected and sent to a computer which can determine the start of a pitch, when a ball was hit, the speed of the ball and the speed of the bat.

69 Claims, 7 Drawing Sheets

SYSTEM FOR DETERMINING THE SPEED AND/OR TIMING OF AN OBJECT

BACKGROUND OF THE INVENTION

1. Field of the Invention

The present invention is directed to a system for determining the speed and/or timing of an object.

2. Description of the Related Art

The remarkable, often astonishing, physical skills and feats of great athletes draw millions of people every day to follow sports that range from the power of football to the grace of figure skating, from the speed of ice hockey to the precision of golf. Sports fans are captivated by the abilities of a basketball player to soar to the rafters, of a baseball pitcher to overwhelm the best hitters in the world, of a batter to hit home runs, of a runner to explode down the track, etc. In televising these events, broadcasters have deployed a varied repertoire of technologies—ranging from slow-motion replay to lipstick-sized cameras mounted on helmets—to highlight for viewers these extraordinary talents. Not only are fans intrigued and excited by the efforts of athletes, their comparative abilities become topics of endless debate at water coolers, in sports bars, on the Internet, etc.

One piece of information that has never been readily and reliably available to fans of sports like baseball is the speed that a batter swings a bat. Such information will not only create a statistic that reflects a critical athletic skill, but will also provide announcers with information that will enhance their analysis of the game. Subtle variations in different players' swings, now verifiable, may explain batting success. This information will be of tremendous interest to baseball fans, and to date there have been no successful attempts to provide such information during the telecast of a game.

There has been an attempt to measure and report bat speed in the past. However, this prior art system required significant amounts of human intervention and utilized too much time to arrive at a speed estimate such that the speed was reported significantly after the event to be of maximum interest to a viewer. Furthermore, the system was not been proven to be sufficiently accurate. The particular system included digitizing multiple frames of a video of a bat swing and estimating the distance of movement of the bat in between frames. This information was used to estimate the speed of the bat. Because of the shortcomings described above, the prior art system could not automatically and reliably determine bat speed in a timely manner.

Another piece of information that has not been readily available to baseball fans is the speed of a ball at the beginning of the pitch, at the end of a pitch and/or after it has been hit. Prior art systems measure the speed of a pitch, but cannot guarantee that the measured speed corresponds to the beginning of the pitch, or the end of the pitch. Such information will provide insight into the success of certain pitchers and batters. This information will be of tremendous interest to baseball fans, and to date there have been no successful attempts to provide such information during the telecast of a game. Bat speed and ball speed will quickly join other popular statistics like running speed and throwing distance in adding to viewers' appreciation of an athletic event. Fans of other sports that involve moving objects are also interested in the speeds of the various moving objects.

Therefore, a system is needed that can determine the speed of an object at desired times with sufficient accuracy to be of interest to a viewer of an event.

SUMMARY OF THE INVENTION

The present invention, roughly described, provides for a system for determining the speed and/or timing of an object. The determined speed and/or timing information can be reported in a format suitable for use on a television broadcast, radio broadcast, the Internet or another medium, etc. Additionally, the information can be made available to another software process or function, or another computer. One example of suitable use for the present invention includes determining the speed that a baseball player swings a bat. Another use of the present invention is to measure the speed of a moving ball. The present invention can also be used to determine the path of a moving object. Other embodiments of the present invention can be used to measure information regarding the movement of other moving objects.

One method for practicing the invention includes automatically detecting the occurrence of a first event and determining the speed of an object during the first event. By automatically, it is meant that a human does not detect the occurrence of the first event. The event detected could be the start of a pitch, the end of a pitch, a bat hitting a ball, a ball starting to travel away from a bat, a bat swing, etc. The system can determine the speed of a ball at the start of a pitch, at the end of a pitch, at the time it begins to travel away from a bat, or at another time. The system can also determine the maximum speed of a bat during a swing, the speed of a bat at the moment it hit a ball, the speed of a bat at various instants during a swing, the time the bat is at certain angles, the acceleration of the bat, etc.

In one embodiment, the system includes sensing radar data using multiple radar units and storing that radar data. The system determines a start of a pitch of a ball, the end of a pitch, the speed of the ball during various points during its flight from the pitcher to the catcher and/or the speed of a bat during a swing. The system can report one or more of the determined speeds and times. In another embodiment, the system can determine a three dimensional velocity vector of an object. By determining the three dimensional velocity vector and position of an object at one or more points, the system can determine the trajectory of the path of the object.

The radar units may provide data for multiple objects in motion. In one example, the invention is used to determine which data represent the swing of a bat. Once the proper data is identified, the identified data is used to determine the speed of the bat. In one embodiment, it is the speed of the tip of the bat that is measured. The present invention can also be used to determine when a bat hit a ball and the speed of the bat swing at that moment and other moments. For example, the time that a bat hit the ball can be determined by identifying when a pitch ended, when a ball began traveling away from a bat or some time between the end of the pitch and the ball starting to travel away from the bat. Alternatively, the radar data for the bat may be used to determined when the bat hit the ball by looking for an abrupt change in speed of the bat.

In one embodiment, the system includes a set of radars positioned behind and pointing toward a batter or other object. Data from the radars is collected and sent to a computer which can determine the timing and/or speed information.

These and other objects and advantages of the invention will appear more clearly from the following detailed description in which the preferred embodiment of the invention has been set forth in conjunction with the drawings.

DETAILED DESCRIPTION

For illustrative purposes, the embodiments described below are used to measure the speed of a baseball and/or a bat at a baseball game. However, the present invention can be used in conjunction with many different moving objects associated with many events and situations, including sporting events and events other than sporting events. For example, the present invention can be used to measure speed and timing information for other balls or objects at other sporting events.

Figure 1:
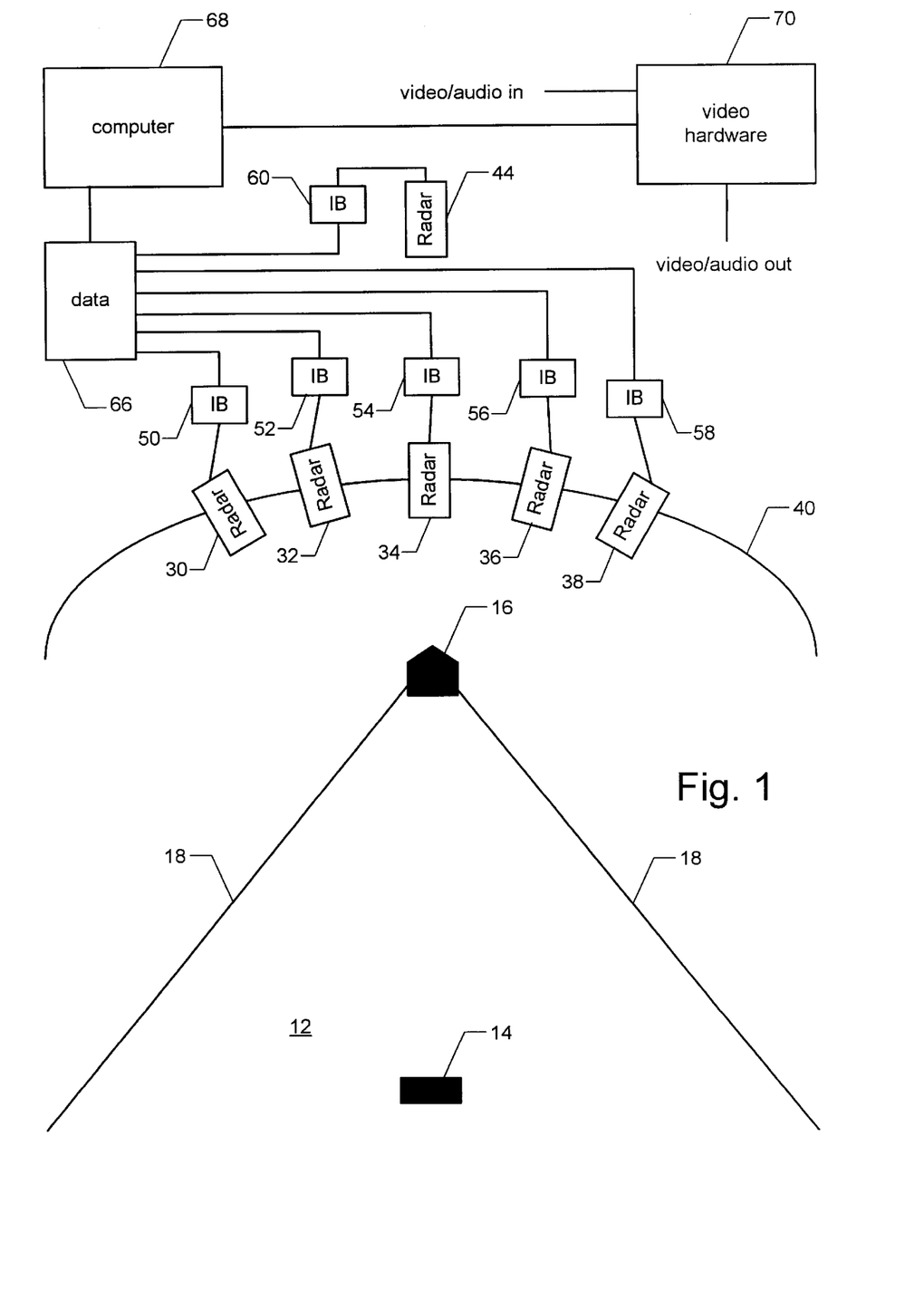
FIG. 1 is a block diagram of one embodiment of the present invention.

FIG. 1 is a block diagram of one exemplar embodiment of the present invention. Depicted in FIG. 1 is a baseball field 12, including a pitcher's mound 14, home plate 16 and baselines 18. Five radar units 30, 32, 34, 36 and 38 are positioned behind and pointed at home plate 16. In one embodiment, the radar units 30–38 are mounted on a wall 40, which is part of the baseball stadium. In other embodiments, the radar units could be mounted on separate support units or any other suitable means. In one embodiment, radar unit 34 is mounted directly behind home plate 16, pointing at home plate 16 and pitcher's mound 14. Radar unit 32 and radar unit 36 are both separated from radar unit 34 by a twelve degree angle (i.e. the true angle between the central axis of the two radar units is 12°). Radar unit 30 and radar unit 38 are both separated from radar unit 34 by a twenty two degree angle. In another embodiment, the radars can be separated at fifteen and twenty four degree angles. Radar units 30, 32, 34, 36 and 38 are mounted at a height that is approximately the average waist height of a baseball player.

The system also includes a sixth radar unit 44 which is also mounted behind home plate 16. Radar unit 44 should be mounted above radar units 30–38. In one embodiment, radar unit 44 is twenty degrees or thirty degrees above the batter. By placing radar unit 44 above the batter, a vertical component of the ball's motion (and the bat's motion) can be measured.

FIG. 1 shows six radar units. The system can operate with more or less than six radar units. In one embodiment, the system can operate with one radar unit. It is preferable to use more than one radar unit in order to make sure there is a clear line of sight to the ball and to account for errors, as well as other features described below.

Various radar units can be used with the present invention. In one embodiment, the present invention uses a Doppler radar unit in order to measure velocity information and timing information of various objects. One embodiment of the present invention uses a Stalker Dual DSR Moving Radar from Applied Concepts, Inc., 730 F Avenue, Suite 200, Plano, Tex. 75074. The Stalker radar system is typically sold as a complete radar system for measuring the speed of objects. The present invention will only utilize what is called the antenna unit portion of the Stalker radar system. The antenna unit is basically a radar transmitter/receiver that operates in the Ka-band from 33.4 to 36.0 GHz. Other Doppler radar units can also be used. The Stalker DSR uses complex sampling so that incoming and outgoing Doppler shifts show up on opposite sides of O in a complex FFT. It is possible to use a radar with real sampling but it would then be difficult to separately measure the speed of the "incoming" pitch and the outgoing bat, which may have similar speeds but of opposite signs.

It is well known that if either the source of a radar signal or the observer of the radar signal is in motion, an apparent shift in frequency will result. This is the Doppler effect. If R is the distance from the radar to the target, the total number of wavelengths $\lambda$ contained in the two-way path between the radar and the target is $2R/\lambda$. The distance R and the wavelength $\lambda$ are assumed to be measured in the same units. Since one wavelength corresponds to an angular excursion of $2\pi$ radians, the total angular excursion $\phi$ made by the electromagnetic wave during its transit to and from the target is $4\pi R/\lambda$ radians. If the target is in motion, R and the phase $\phi$ are continually changing. A change in $\phi$ with respect to time is equal to a frequency. This is the Doppler angular frequency $W_d$, given by $$W_d = 2\pi f_d = \frac{d\phi}{dt} = \frac{4\pi}{\lambda}\frac{dR}{dt} = \frac{4\pi V}{\lambda}$$

where $f_d$=Doppler frequency shift $V_r$=relative (or radial) velocity of target with respect to radar.

The Doppler frequency shift is $$f_d = \frac{2V_r}{\lambda} = \frac{2V_r f_0}{c}$$

where $f_0$=transmitted frequency c=velocity of propagation=$3 \times 10^8$ m/sec and $$V_r = \frac{f_d c}{2 f_0}$$

Thus, a Doppler radar can be used to measure velocity and/or speed.

Each radar unit is connected to an interface board. Radar unit 30 is connected to interface board 50, radar unit 32 is connected to interface board 52, radar unit 34 is connected to interface board 54, radar unit 36 is connected to interface board 56, radar unit 38 is connected to interface board 58 and radar unit 44 is connected to interface board 60. The interface boards provide a clock signal to the radar units and receive the data from the radar units. The interface boards convert the data from the radar units into a differential data format to send over a long wire at a high band width. Each of the interface boards are connected to data concentrator 66. Data concentrator 66 sends a timing signal to each interface board in order for the interface board to provide the clock signal to the respective radar units. Additionally, data concentrator 66 converts and packages the data received from the interface boards to a format readable and expected by computer 68. Data concentrator 66 communicates the data to computer 68. In one embodiment, data concentrator 66 is a computer. In another embodiment, it is a custom electronic design which includes a processor.

In one embodiment, computer 68 includes a Pentium II 450 MHz processor. In alternative embodiments, computer 68 can include a different processor or can utilize multiple processors. Computer 68 can also include RAM, a hard drive, a floppy disk, a display, a keyboard, a printer, a pointing device, a CD-ROM unit, a modem and/or a network interface. Computer 68 processes the information received from data concentrator 66 and determines the speeds and timing information in question. Computer 68 includes software for providing a graphical user interface (GUI) to inform a user of the results of the processes. Additionally, the GUI can be used to allow an operator to configure, test and/or operate the system. Computer 68 reports the results of its processes to a client. The results are typically reported in event records. An event record could include the type of event, the timing of the event and measured speed(s). Computer 68 will also typically receive time codes from a broadcaster of a sporting event or another source for synchronization purposes. The system can also use the internal clock of computer 68.

In one embodiment, computer 68 sends the event records to a broadcaster or other information gatherer. In another embodiment, computer 68 sends the event records to video hardware 70. Video hardware 70 can be any hardware that takes the information from computer 68 and edits the video of the baseball game to add the information from computer 68 into the video. For example, video hardware 70 can be a computer which receives the information from computer 68 and a video signal and/or an audio signal. The computer of video hardware 70 can add a graphic or text to the video to display the information of the event record (e.g. bat speed, ball speed, etc.). Alternatively, prestored audio or synthesized audio can be used to add an audio indication of the event (e.g. bat speed, ball speed, etc.). In another embodiment, video hardware 70 can include a keyer and a graphics generator. A graphics generator can create a graphic which displays the information contained in the event record and a keyer can be used to blend or key the graphic with the video of the baseball game. One example of a graphics generator is a computer such as an O2 Workstation from Silicon Graphics. Another alternative is to use a Chyron machine to insert text or graphics into video. The resulting video is then transmitted for either broadcasting, recording or other display purposes. In yet another embodiment, the results of computer 68 can be printed or displayed on a monitor for use by statisticians, the broadcast announcers, coaches, players or fans.

Figure 2:
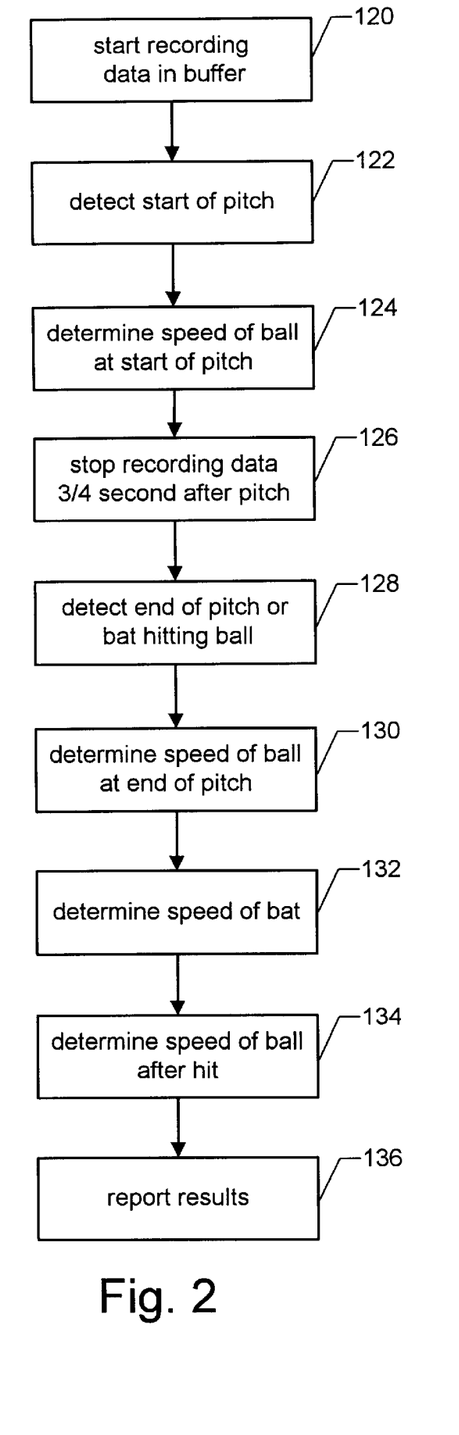
FIG. 2 is a flow chart describing the method of operation of one embodiment of the present invention.

As will be explained below, the present invention can be used to measure the speed of a bat, a ball being thrown, the timing of a pitch, the timing of a hit, the speed of other objects and the timing of other events. FIG. 2 is a flow chart which explains the method of operation of one embodiment of the present invention.

In step 120, the system begins recording data in a buffer. That is, the radar units are transmitting and receiving radar information which is being processed by interface boards 50, 52, 54, 56, 58 and 60 and data concentrator 66. The data is packaged together by data concentrator 66 and sent to computer 68 which stores the data in a circular buffer. Data continues to be sensed by the radars and recorded in the circular buffer until step 126. In one embodiment, even after the data is no longer being recorded in the circular buffer, the radar units are still sensing new data.

In step 122, the system detects the start of a pitch. That is, computer 68 executes a loop which accesses the data in the circular buffer and attempts to determine whether the data in the buffer indicates the start of a pitch. Step 122 is continuously performed until the start of a pitch is detected.

After the start of a pitch is detected, computer 68 will continue to record data in the circular buffer for an additional three-quarters of a second (step 126). In step 124, computer 68 will determine the speed of the ball at the start of the pitch. After computer 68 stops recording data (step 126), computer 68 will perform a process for detecting the end of a pitch or the bat hitting a ball in step 128. In step 130, computer 68 will determine the speed of the ball at the end of a pitch. In step 132, computer 68 will determine the speed of the bat. In step 134, computer 68 will determine the speed of the ball after it was hit. In step 136, computer 68 will report the results of the previous steps. Reporting the results could include providing any of the information from steps 122–134 to a monitor, to a printer, to another function, to another process, to a disk, to another computer via a network or telephone line, etc. As described with respect to FIG. 1, the information can be stored as part of an event record which, in one embodiment, is communicated to a broadcaster of the baseball event or to a coach, player or fan. The steps of FIG. 2 are performed by computer 68. In one embodiment, computer 68 is a general purpose computer programmed with software to perform the steps described herein. In another embodiment, computer 68 can be a special purpose computer designed specifically to perform the described steps.

The flow chart of FIG. 2 shows steps for determining start of pitch, end of pitch, bat hitting ball, speed of a ball at various times and the speed of a bat. Various embodiments of the present invention may implement only a subset of these features. For example, one embodiment may only determine bat speed or only determine ball speed at a subset of times, etc. Additionally, the order of the steps of FIG. 2 can be rearranged within the spirit of the present invention. For example, the order of steps 128–134 can be changed or one or more of steps 128–134 can be started prior to steps 124 and/or 126 if there is enough processing power and storage.

Figure 3:
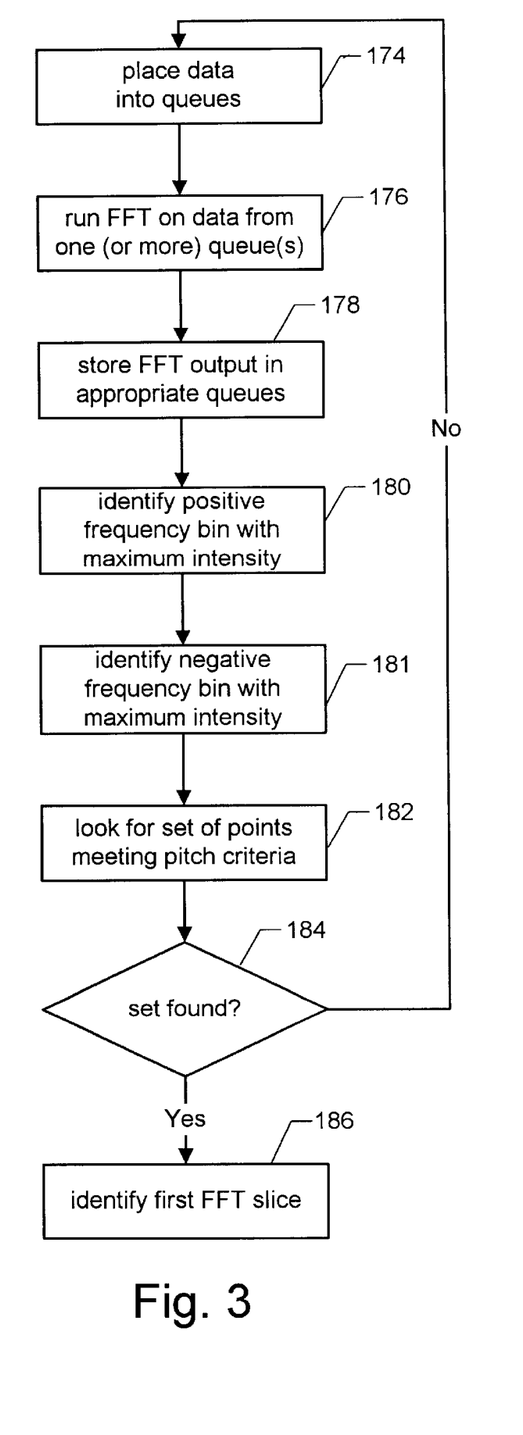
FIG. 3 is a flow chart describing the steps of detecting the start of a pitch.
Figure 4:
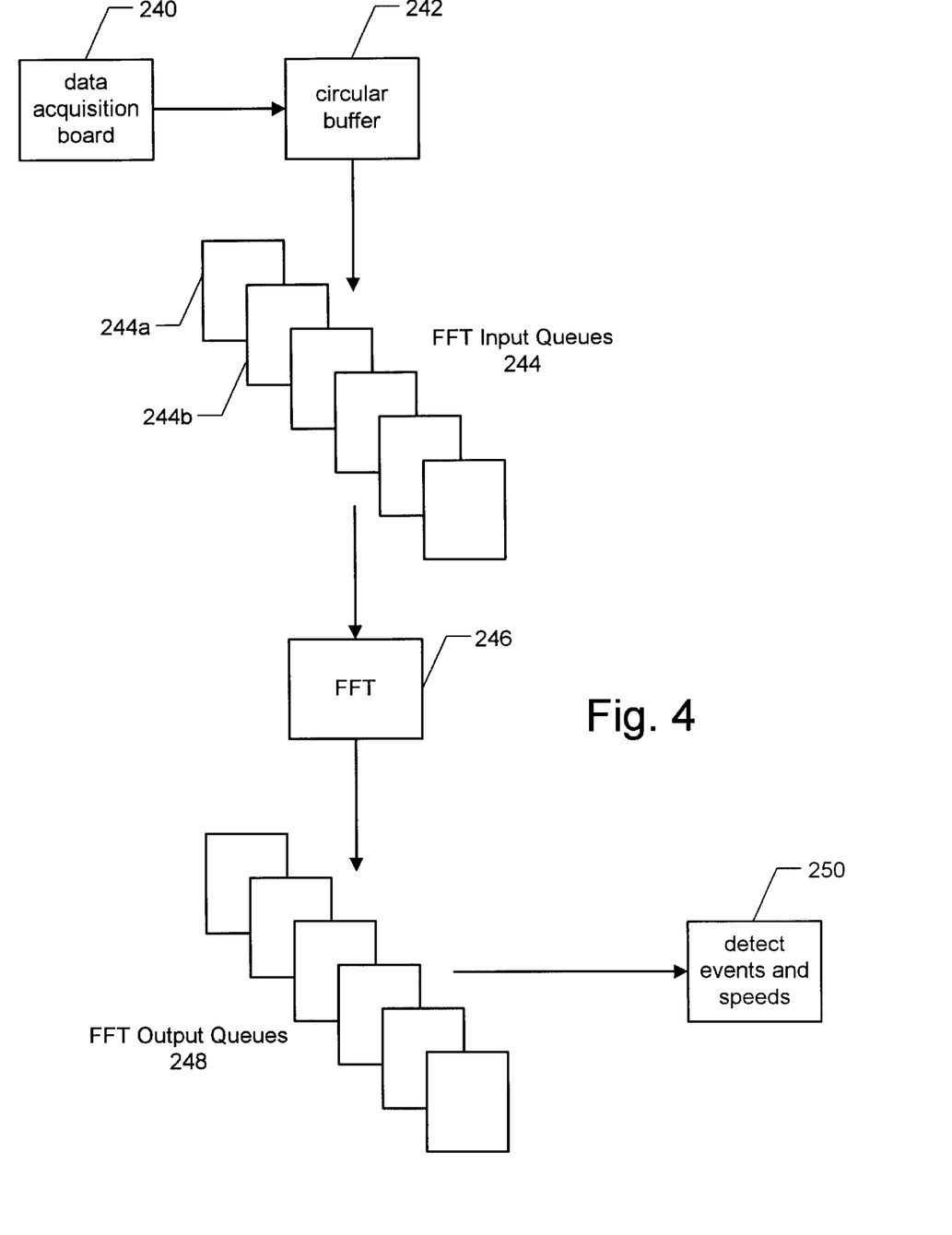
FIG. 4 shows the flow of data for one embodiment of the present invention.

FIG. 3 is a flow chart describing the steps of detecting the start of a pitch (step 122 of FIG. 2). In step 174, data received by computer 68 from data concentrator 66 is placed into a set of queues. FIG. 4 shows the flow of data for one embodiment of the present invention. Everything shown in FIG. 4 takes place within computer 68. Data received by computer 68 from data concentrator 66 is first received by a data acquisition board 240 inside computer 68. In one embodiment, data acquisition board 240 is a 6533 (DIO-32HS) high speed, parallel digital I/O interface for PCI, PX Compact PCI, PCMCIA and ISA computers, manufactured by National Instruments Corporation. Otherboards can also be used. The data received by data acquisition board 240 is sent to circular buffer 242. In one embodiment, circular buffer 242 includes two megabytes of RAM. In one embodiment, data is stored in the circular buffer in 128K samples per channel. Computer 68 also maintains a set of FFT input queues 244 such that there is one input queue per radar unit. Thus, in the embodiment of FIG. 1, queues 244 includes six separate queues. Step 174 of FIG. 3 includes moving data from circular buffer 242 into the appropriate FFT input queue 244. For example, data from radar unit 30 is stored in FFT input queue 244A and data from radar unit 32 is stored into FFT input queue 244B. In one embodiment, the radar units used are phase quadrature radar units. Thus, each queue will store Q data and I data for each radar along with status data and synchronization data. In one embodiment, step 174 will include placing 512 digital data samples into the FFT input queue(s) the first time step 174 is performed. At each subsequent instance that step 174 is performed the newest 128 samples will be moved to the FFT input queue 244.

In step 176, computer 68 runs a Fast Fourier Transform (FFT) on data from one of the queues. In one alternative, the system performs a full Fourier Transform, rather than an FFT. However, the FFT requires less computing power and is still considered a Fourier Transform. In an alternative embodiment, rather than using a Fourier Transform, the system uses another frequency-time resolution algorithm. In one embodiment, the FFT of step 176 is performed on data from radar unit 34. In another embodiment, different radars can be used. In another embodiment, step 176 can be performed using data from more than one radar or queue as long as there is enough computing power. The reason radar unit 34 is chosen in the exemplar embodiment is because radar unit 34 is pointed directly at both home plate and the pitcher's mound so that radar unit 34 can sense data from the pitcher and the batter. FIG. 4 shows step 176 being performed by FFT software module 246. In step 178, the output of FFT module 246 is stored in FFT output queues 248, such that there is one queue for each radar unit similar to the FFT input queues 244. Since step 176 only performed an FFT on data from one queue, the output of FFT 246 in step 178 is only stored in one corresponding queue. The data in the FFT output queues are used by the software for detecting events and determining speeds as described below.

Figure 5:
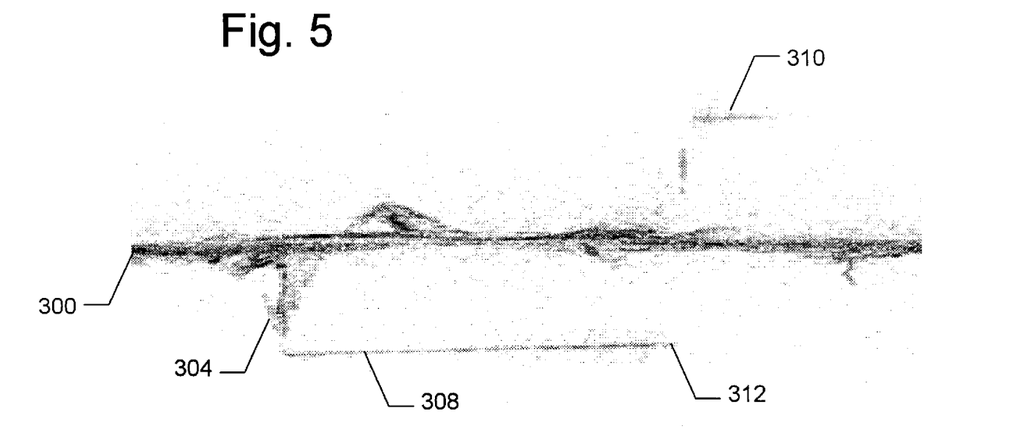
FIG. 5 is a graphical representation of data from a radar unit after a Fast Fourier Transform (FFT).

FIG. 5 is an exemplar wave form based on data from one radar after an FFT has been performed. The horizontal axis of the graph represents time and the vertical axis of the graph represents frequency. The intensity of each pixel in the graph is proportional to the amplitude of the signal received for the particular time and frequency data. Reference number 300 approximates the zero line. Data below the zero line represents negative speed (e.g. an object moving towards the radar unit) and data above the zero line represents positive speed (e.g. an object moving away from the radar unit). The triangle-like grouping of data noted by numeral 304 represents the movement of the pitcher in a wind-up to throw a pitch. Line of data 308 represents the ball moving from the pitcher toward the batter. Reference 312 represents the end of the pitch and reference 310 represents the ball leaving the bat.

Figure 6:
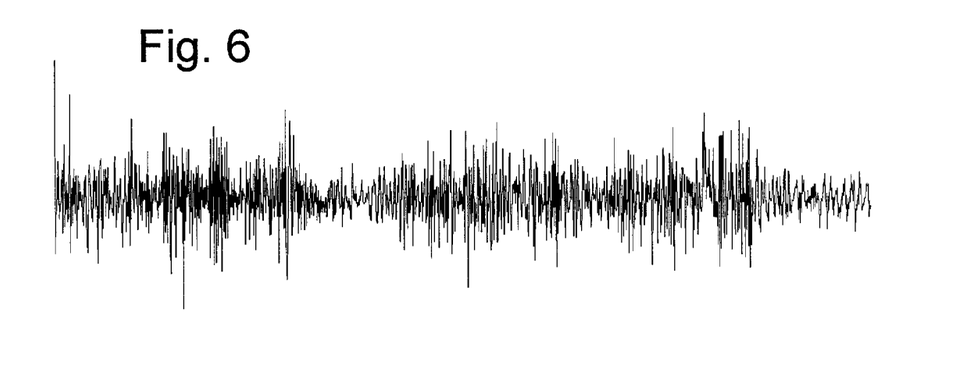
FIG. 6 is a graphical representation of data from a radar unit plotted in the time domain.

FIG. 6 shows a time domain representation of the radar data where the horizontal axis represents time and the vertical axis represents the amplitude of the radar return signal. FIG. 6 shows approximately 1 second of data at a sampling rate of about 44,000 samples per second. At an interval of 128 samples, the next 512 samples are provided to the FFT computation block 246. The output of FFT computation block 246 is 512 frequency bins, where 256 frequency bins represent negative speed (towards the radar unit) and 256 frequency bins represent positive speed (away from the radar unit). FIG. 5 shows a collection of the outputs of FFT computation block 246. For each point along the horizontal axis of FIG. 5, one FFT output is plotted vertically—this is called an FFT slice. The top most point represents maximum positive frequency. The bottom most point represents maximum negative frequency. The intensity of each point represents the amount of radar energy returned at the frequency (Doppler shift). The vertical axis is broken in to a number of frequency bins. Each bin represents the radar return energy between two frequency limits.

Looking back at FIG. 3, step 180 includes looking at the output of step 176 at 256 positive frequency bins. For the FFT output sample under consideration, computer 68 chooses the frequency bin corresponding the to the maximum (or peak) intensity value measured. In one embodiment, step 180 includes only looking at intensity values in a subwindow of frequencies. One suitable subwindow includes frequencies corresponding to 25mph–120mph. Step 181 also includes looking at the FFT output data of step 176 at 256 negative frequency bins. For the FFT output sample, computer 68 chooses the frequency bin corresponding to the maximum (or peak) intensity value measured. In one embodiment, step 181 includes only looking at intensity values in a subwindow of frequencies. One suitable subwindow includes frequencies corresponding to 45mph–110 mph.

In step 182, computer 68 looks for a set of points that meet a pitch criteria. One example of suitable pitch criteria is to find a set of points of the data points identified in the current and previous iterations of step 181 such that a set of N consecutive points are within M frequency bins of each other. For example, the criteria could be that at least 10 points (N=10) are within 2 frequency bins of each other.

If a set of data points meeting the pitch criteria is found (step 184), then computer 68 proceeds to step 186 and identifies the earliest FFT slice in the data set found in step 182. That is, each data point is associated with an FFT slice (output of step 176). Each FFT slice is created by taking an FFT of 512 samples. The time of the FFT slice is the time associated with the $256^{th}$ sample of the FFT slice. The slice identified in step 186 represents the start of the pitch. The time of the start of the pitch is the time of the FFT slice. If in step 184 it is determined that a set of points matching the pitch criteria was not found, then the system loops back to step 174 and repeats step 174–182 on a new grouping of data. In one embodiment, the next iteration of steps 174–182 can be performed on a group of data that overlaps with the previous group of data. For example, when the system loops back to step 174, 128 new samples are placed into the queue. The FFT of step 176 is performed using the new 128 samples and the previous 384 samples.

Once the start of a pitch is determined and, consequently, the data representing the pitch is identified, determining the speed of the pitch in any given time is accomplished by looking at the data like that of FIG. 5. For example, the speed of the ball during a pitch for a given time is represented by line 308. Thus, computer 68 would access the data for a particular FFT slice associated with the time of interest and read the frequency data. Note that line 308 slopes upward as it moves to the right because the pitch slows down over time.

Figure 7:
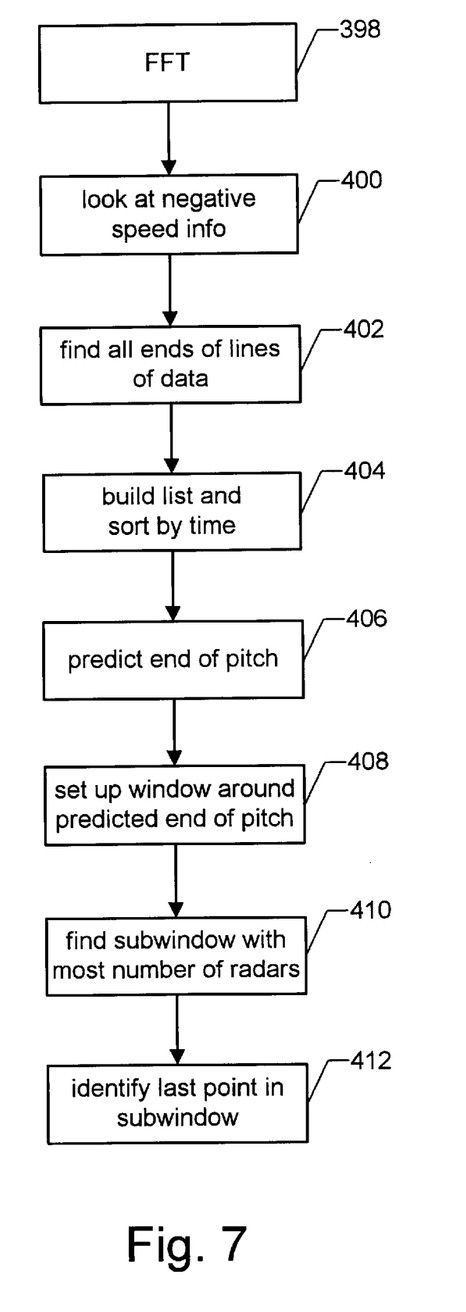
FIG. 7 is a flow chart describing the steps of detecting the end of a pitch.

FIG. 7 provides a flow chart describing the steps for detecting the end of a pitch (step 128 of FIG. 2). The end of the pitch typically represents either the ball hitting the catcher's mitt or hitting the bat. In a rare circumstance, the ball could continue to travel past the catcher if the catcher fails to catch the pitch. In the latter case, the end of the pitch could be detected by the point in which the radar units no longer see the ball.

In step 398, Fast Fourier Transforms are performed for data in FFT input queue 244 for all of the radars. It is possible that step 398 can be started at an earlier time to speed up the process of FIG. 7. The process of FIG. 7 restricts its computations to look only at data for negative speeds (step 400). Negative speed data represents the ball moving towards the radar and, thus, towards home plate.

In step 402, computer 68 looks for ends of lines of data in the post FFT data (e.g. data from the FFT output queues 248). For example, FIG. 5 shows a line of data 308 and a line of data 310. However, line of data 310 is for positive speeds so it would not be considered in step 402. Line of data 308 is for a negative speed and would be considered in step 402. The end of the line of data 308 is depicted by reference number 312. It is possible that a graph similar to FIG. 5 may be broken up into a number of dashes due to noise in the signal or the view of the pitched ball being obscured by a person or other object, where each dash would have its own end identified in step 402. Additionally, step 402 is performed on sets of data from all of the radars. Note that FIG. 5 only shows data from one radar. By identifying the ends of lines, computer 68 will note the time and radar for each data point. In step 404, computer 68 builds a list of all data points found in step 402. That list is sorted by time in step 404. In step 406, computer 68 predicts the end of the pitch. That is, it is known that the distance from the pitcher's mound 14 to home plate 16 is 60.5 feet and an example of the speed of the ball can be determined by looking at the data of FIG. 5. The estimated time of the end of pitch is determined by using the equation $$Time = \frac{Distance}{Rate} + Time\ of\ Pitch$$

In step 408, computer 68 uses the predicted end of pitch from step 406 and sets up a time window around the predicted end of pitch. An exemplar time window can be 150 milliseconds with the center of the window at the predicted end of pitch time determined in step 406. In step 410, computer 68 finds a subwindow (e.g. 30 milliseconds) within the window of step 408 for which the most number of radars have data points present. That is, every subwindow within the window is evaluated to see which subwindow has data from the most radars. In step 412, the last data point in the subwindow identified in step 410 is chosen as the data point representing the end of pitch.

Figure 8:
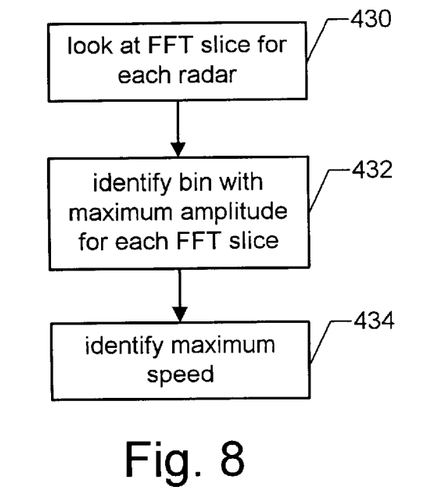
FIG. 8 is a flow chart describing the steps of determining the speed of a ball.

FIG. 8 is a flow chart describing the steps for determining the speed of a ball at the end of the pitch. Once knowing the time for the end of the pitch, computer 68 can look at the data from the radar units at that time to find the speed of the ball at the end of the pitch (step 130 of FIG. 2). In step 430, computer 68 will identify an appropriate FFT slice for each radar. The appropriate FFT slice is the slice whose 256$^{th}$ sample is at the time of the end of the pitch. In step 432, computer 68 will identify the frequency bin with the highest intensity for each FFT slice from step 430. Each of the frequency bins identified in step 432 correspond to a speed. In step 434, the maximum speed of the speeds identified as part of step 432 is chosen as the ball speed. Note that FIG. 8 can also be used to determine the speed of the ball at the beginning of pitch, after a hit, or at some other time. When determining the speed at the beginning of a pitch, use the data corresponding to the time determined in step 122. When determining the speed after a hit, use the technology of the method of FIG. 3 to determine the start of the ball in the positive direction and use data corresponding to that time with the steps of FIG. 8 to determine the speed of the ball after being hit.

Figure 9:
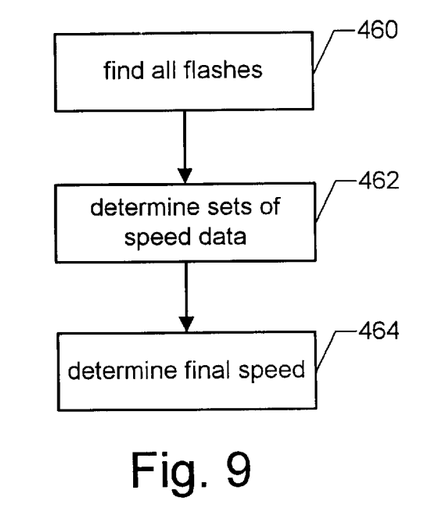
FIG. 9 is a flow chart describing the steps of determining the speed of a bat.
Figure 10:
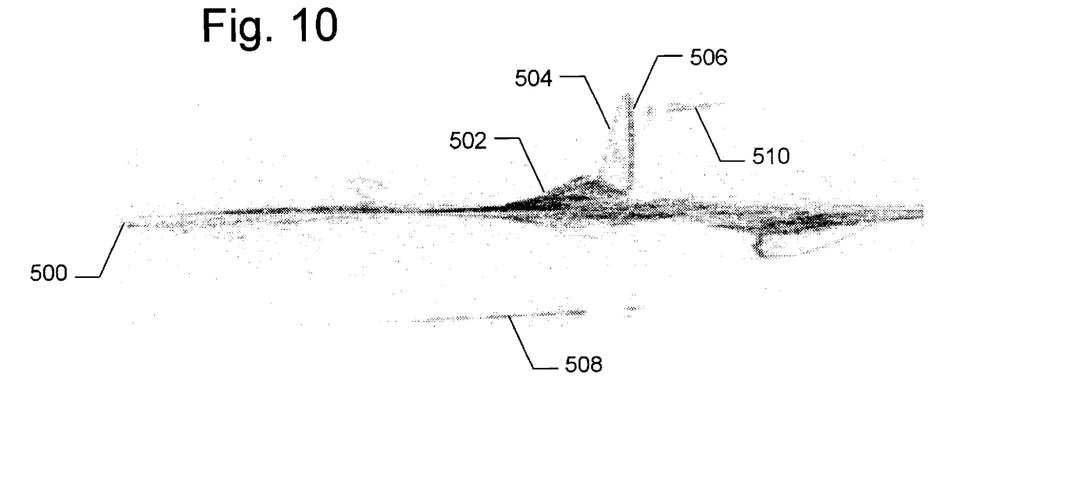
FIG. 10 is a graphical representation of data from a radar unit after a Fast Fourier Transform.
Figure 11:
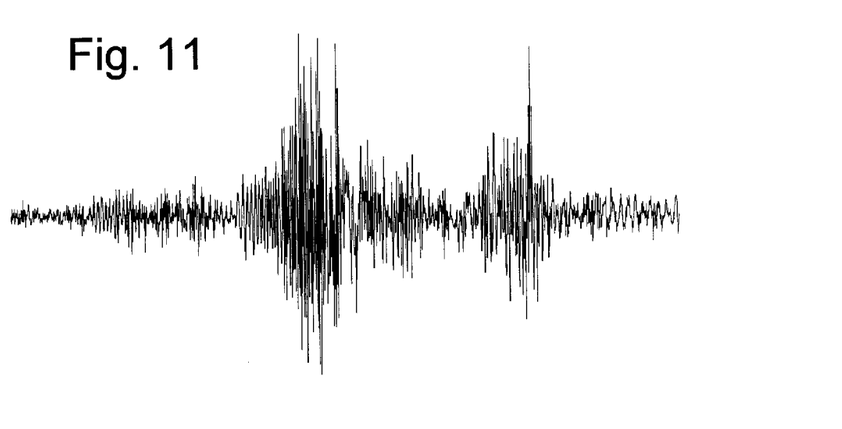
FIG. 11 is a graphical representation of data from a radar unit plotted in the time domain.

FIG. 9 is a flow chart which describes the steps for determining the speed of a bat during a swing (step 132 of FIG. 2). In step 460, the system identifies the flash for each radar. The flash is a point in time when the surface of the bat is perpendicular to the radar so that the radar receives the strongest signal back from the bat. The concept of a bat flash will be better understood from looking at FIG. 10 which shows a graph of data from a radar after a FFT. The data of FIG. 10 represents a radar unit detecting data representing a bat swing. FIG. 10 plots time on the horizontal axis and frequency on the vertical axis. Reference 500 represents the approximation of zero on the vertical axis. Broken line 508 represents the ball thrown towards the home plate 16. Cluster of data 502 represents the motion of the batter swinging. Ramp 504 is data representing the end (or tip) of the bat during a bat swing. Because the end of the bat is rounded, there is always a surface that is perpendicular to the radar. Line 506 represents the flash of the bat such that majority of the bat is perpendicular to the radar and the most data for the bat is received. Line 510 represents the ball traveling away from home plate 16 after being hit by a bat. FIG. 11 shows time domain data corresponding to data of FIG. 10.

Figure 12:
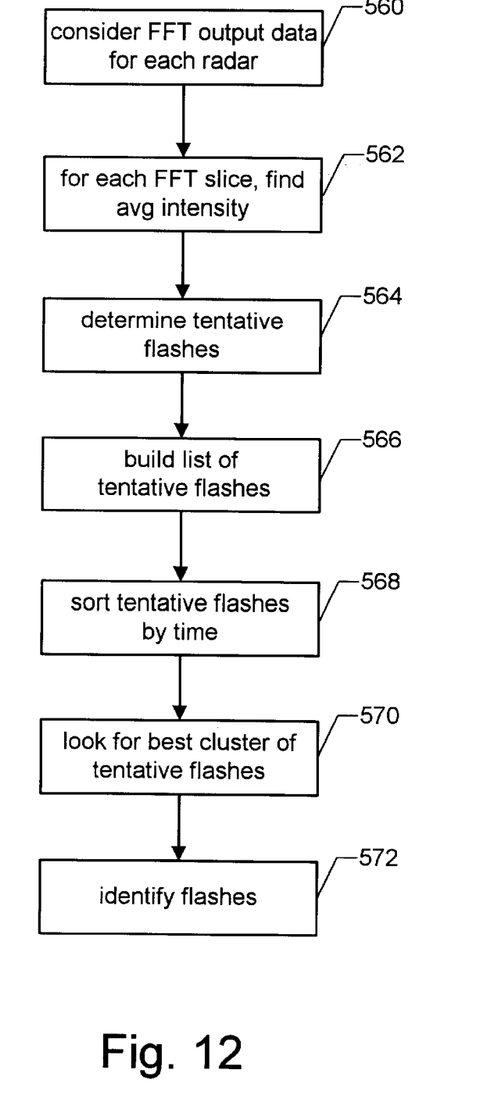
FIG. 12 is a flow chart describing the steps of finding a flash.

FIG. 12 is a flow chart describing the method for finding the flashes (step 460). Step 560 includes considering the FFT output data for each radar. For each FFT slice, average intensity for all of the frequency bins between a minimum and maximum positive speed is calculated (step 562). Rather than finding an average of all data points, the average intensity will only be calculated for a subwindow. One example of a subwindow is frequencies corresponding to 30–90 mph. In step 564, computer 68 determines tentative flashes. In one embodiment, step 564 includes comparing each of the average intensities calculated in step 562 with a threshold value. One example of a threshold value is 10 dB above the noise floor. All average intensity values that are above the threshold are considered tentative flashes. In one embodiment, an FFT slice is rejected as a tentative flash if the average intensity is not higher than the average intensities of both neighboring FFT slices. In step 566, computer 68 creates a list of tentative flashes. In step 568, the list of tentative flashes is sorted by time. In step 570, computer 68 looks for the best cluster of tentative flashes. One method for determining the best cluster of tentative flashes is to create a time window. One example of a suitable time window is 60 ms. The system will look for the time window which has tentative flashes from the largest number of radars. In step 572, computer 68 identifies the flashes from within the window determined in step 570. For any radar that has more than one tentative flash in the window determined in step 570, the flash with the most energy is chosen. By the conclusion of step 572, each radar will have no more than one tentative flash left in the chosen set from step 570. This set of flashes is considered the actual flashes.

Figure 13:
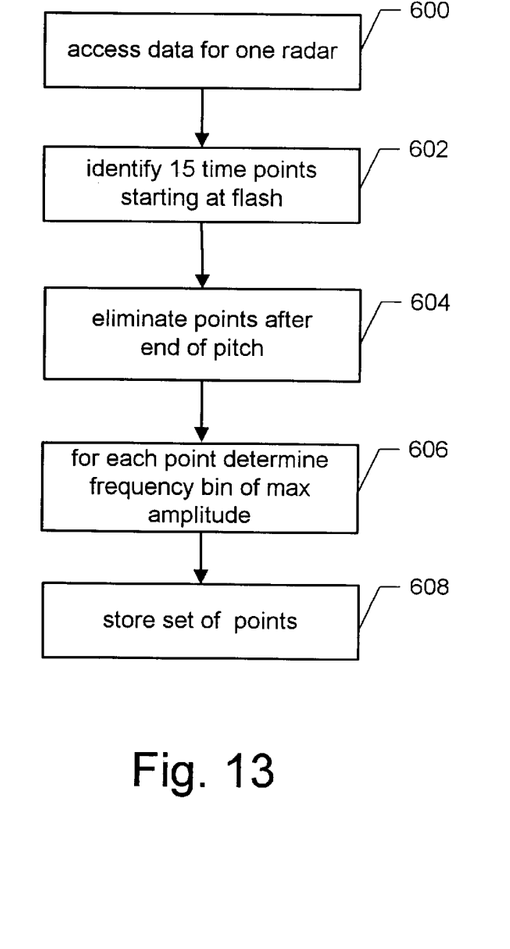
FIG. 13 is a flow chart describing the steps of determining sets of speed data.

Looking back at FIG. 9, after finding all of the flashes in step 460, computer 68 determines sets of speed data corresponding to the bat in step 462. FIG. 13 is a flow chart which provides one example of a method for performing step 462. The steps of FIG. 13 are repeated for each radar unit. In step 600, computer 68 accesses data for one radar unit. In step 602, computer 68 identifies fifteen FFT slices that are before or at the same time as the bat flash. In one embodiment, the system chooses the FFT slices immediately before the bat flash and the FFT slice at the bat flash. In step 604, FFT slices that are later in time than the determined end of pitch are eliminated from consideration. In step 606, computer 68 determines the frequency bin within each FFT slice that has the maximum intensity. In one embodiment, the frequency bins are broken up into. 0.84 mph increments. In step 608, the data is stored by computer 68. The stored data includes a frequency bin value and a time value for the FFT slices.

The method of FIG. 13 is used to identify data representing the motion of the bat. In many cases, the system can usually "see" the bat tip ramp (e.g. 504 of FIG. 10), but the frequency bins which represent the bat tip ramp are not necessarily the frequency bins with the maximum intensity. An alternate embodiment utilizes the observation that the bat tip ramp is quite linear for the portion before the bat flash. A convolution integral can be computed between the FFT output data before the bat flash and a line. This is done for many lines at different slopes and y intercepts in order to find the line which has the highest convolution integral.

Assume the equation of a line is y=m*x+b where m is the slope of a line and b is the y intercept. The following represents pseudo code for performing this method:

```
MaximumConvolution = 0;
for(m = MINIMUM_M; m<MAXIMUM_M; m = m + INCREMENT_M)
{
        //loop through values of m
    for(b = MINIMUM_B; b<MAXIMUM_B; b = b + INCREMENT_B)
    {
        //loop through values of b
        //compute the convolution integral
        Convolution = 0;
        for(x = FLASH_X - 15; x<FLASH_X; x++)
        {
            y = m*x+b;
            Convolution += fftoutput(x,y);
        }
        if(Convolution > MaximumConvolution)
        {
            //save this as the maximum found so far
            MaximumConvolution = Convolution;
            MaximumM = m;
            MaximumB = b
        }
    }
}
```

After computer 68 finds the line that has the highest convolution integral, computer 68 can declare that all of the speeds that make up the bat tip ramp are along or very close to this line. Next, computer 68 does a very local search (+/−2 frequency bins) to the points along this line for the frequency bins with the maximum intensity, thus, identifying the set of points to be stored as part of step 462. This method improves the noise rejection of the bat speed detection.

Looking back at FIG. 9, after computer 68 determines the sets of speed data in step 462, computer 68 determines the final speed. In one embodiment, the speed sought to be determined in step 464 is the maximum speed of the bat during the swing. In this embodiment, computer 68 will look at all the data stored as a result in step 462. Each of the stored data points correspond to a speed. The maximum speed stored is the speed determined in step 464.

In an alternative embodiment, step 464 looks to determine the speed of the bat at the time the bat hit the ball. The time of the bat hitting the ball can be identified, in one example, as the time of the end of the pitch. In that case, step 464 can include looking for all the speed (or frequency) points that have the same time value as the end of pitch time and choosing the highest speed (if there is a choice). In another embodiment, step 464 can include choosing the highest speed within a small time of the end of a pitch.

In one embodiment, when trying to determine the speed of the bat at the time the bat hit the ball, there may not be any data point in step 462 that matches the exact time that the pitch ended. In that case, computer 68 can determine the closest data point before the end of the pitch and the closest data point after the end of pitch and interpolate to determine bat speed at the end of the pitch. In one embodiment, rather than interpolate the bat speed can be determined using the equation Rate×Time=Distance, with the distance between two data points determined in relation to the flashes and the degrees of separation between the radars.

The embodiments described above use the end of pitch to identify the time the ball hit the bat. In another embodiment, the system can use the time at which the ball began traveling away from home plate to represent the time the ball hit the bat. The system can identify the appropriate ball speed and the time the ball began traveling away from the home plate after being hit using the steps of FIG. 3. In another embodiment, the time of the ball hitting the bat can be represented by the mid point between the end of the pitch and the start of the ball moving away from the batter if the two times are not identical.

In another embodiment, the system can determine the speed of the bat at each flash and choose the highest speed as the bat speed. In yet another embodiment, the time the ball hit the bat can be determined by looking at the radar data for the bat and identifying a moment when there is an abrupt change in bat speed.

In another embodiment, data from three (or more) radars can be used to determine a velocity vector of the ball or other object. If the position and the velocity vector of the ball is determined at one or more times, an estimate of the trajectory and the path of the ball can be determined. One method for determining the velocity vector of the ball using data from three radars is to solve simultaneous equations based on the location of the three radars and the measured speed of the ball from three radars.

Assume that the ball is at the origin of a coordinate system (x, y, z=0)

Let $R_1$=Unit vector of radar 1

Let $R_2$=Unit vector of radar 2

Let $R_3$=Unit vector of radar 3

Let V=Velocity vector of the ball ($V_x$, $V_y$, $V_x$)

Let $V_1$=Velocity of ball measured at radar 1

Let $V_2$=Velocity of ball measured at radar 2

Let $V_3$=Velocity of ball measured at radar 3

The velocity of the ball measured by a radar is equal to the dot product of the velocity vector and the unit vector in the direction from the ball to the radar. So:

$V_1 = R_1 \cdot V$ $V_2 = R_2 \cdot V$ $V_3 = R_3 \cdot V$ $$\begin{bmatrix} V_1 \\ V_2 \\ V_3 \end{bmatrix} = \begin{bmatrix} R_{1x} & R_{1y} & R_{1z} \\ R_{2x} & R_{2y} & R_{2z} \\ R_{3x} & R_{3y} & R_{3z} \end{bmatrix} \cdot \begin{bmatrix} V_x \\ V_y \\ V_z \end{bmatrix}$$

$$\begin{bmatrix} V_x \\ V_y \\ V_z \end{bmatrix} = \begin{bmatrix} R_{1x} & R_{1y} & R_{1z} \\ R_{2x} & R_{2y} & R_{2z} \\ R_{3x} & R_{3y} & R_{3z} \end{bmatrix}^{-1} \cdot \begin{bmatrix} V_1 \\ V_2 \\ V_3 \end{bmatrix}$$

Using these equations, computer 68 can solve for the velocity vector V since $R_1$, $R_2$ and $R_3$ are known and $V_1$, $V_2$ and $V_3$ are measured. When determining a velocity vector, the system should use data from at least three radar units that are not in a line. One of the radars should be a radar at a higher height than the others.

The disclosed system can also be used to measure the spin rate of the ball by either looking at the width of the Doppler signature (e.g. line 308 of FIG. 5) or performing a Fourier Transform on the output of the first Fourier Transform to measure the frequency of the pattern in the first Fourier Transform.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for determining a speed of a bat during a swing, comprising the steps of:

automatically detecting an occurrence of a ball traveling toward said bat; and automatically determining said speed of said bat during said swing in response to detecting said occurrence of said ball traveling toward said bat.

2. A method according to claim 1, further comprising the steps of:

using a radar unit to obtain a set of speed data; and determining a subset of data from said set of speed data that pertains to said bat, said step of automatically determining said speed uses said subset of data to determine said speed of said bat during said swing.

3. A method according to claim 1, further comprising the step of:

detecting said bat hitting a ball, said step of automatically determining is partially based on said step of detecting said bat hitting said ball.

4. A method according to claim 1, further comprising the step of:

identifying a bat flash with respect to a radar unit.

5. A method according to claim 1, wherein:

said step of automatically determining includes determining a maximum bat speed during said swing.

6. A method according to claim 1, wherein said step of automatically determining said speed comprises the steps of:

identifying radar data representing one or more flashes of said bat;

determining one or more sets of radar data in time proximity to said flashes; and determining a speed based on said one or more sets of radar data.

7. A method according to claim 1, wherein said step of automatically detecting comprises the steps of:

performing a Fourier Transform on at least a subset of radar data received from a radar unit;

identifying peak intensities for a set of slices from said transformed radar data; and identifying a speed based on said peak intensities meeting predefined pitch criteria.

8. A method according to claim 1, wherein said step of automatically determining said speed comprises the steps of:

predicting an end of a flight of said ball;

identifying a set of end of line points within a window near said predicted end of said flight; and identifying a particular end of line point within said window.

9. A method according to claim 1, wherein:

said steps of detecting and determining are performed within 5 seconds.

10. A method according to claim 1, wherein:

said steps of detecting and determining are performed in real time.

11. A method according to claim 1, further including the step of:

reporting said speed.

12. A method according to claim 1, wherein:

said speed is determined using data from more than one radar unit.

13. A method according to claim 1, further comprising the step of:

determining a velocity vector for said bat.

14. A method according to claim 1, wherein:

said bat has a tip; and said step of automatically determining said speed includes using a plurality of radar units to determine a speed of said tip.

15. A method according to claim 1, wherein:

said step of automatically determining said speed includes detecting Doppler radar data from a plurality of radar units, identifying a first set of data from said Doppler radar data that pertains to said bat and determining said speed of said based on said first set of data.

16. A method according to claim 1, wherein:

said step of automatically determining said speed includes calculating a plurality of bat speeds at multiple times during said bat swing, choosing a fastest speed from said calculated plurality of bat speeds and reporting said chosen fastest speed.

17. A method according to claim 1, wherein:

said step of automatically detecting is performed using data from one radar unit; and said step of automatically determining said speed is performed using data from multiple radar units.

18. A method according to claim 1, wherein:

said step of automatically detecting is performed using data from multiple radars;

said step of automatically detecting includes detecting a start of said ball traveling toward said bat.

19. A method for determining speed information during a live baseball game, comprising the steps of:

sensing data using multiple radar units;

processing said data;

determining a start of a pitch of a ball based on said processed data;

determining an end of said pitch based on said processed data and in response to said step of determining a start of a pitch;

determining a speed of said ball during said pitch based on said processed data and in response to said step of determining a start of a pitch;

determining a speed of a bat during a swing attempting to hit said ball based on said processed data and in response to said step of determining a start of a pitch; and reporting one or more of said determined speeds.

20. A method according to claim 19, wherein said step of determining a start of a pitch of a ball comprises the steps of:

performing a Fourier Transform on at least a subset of said stored radar data;

identifying peak intensities for a set of slices from said transformed radar data;

identifying a set of peak intensities meeting predefined pitch criteria; and choosing one peak intensity from said identified set of peak intensities.

21. A method according to claim 19, wherein said step of determining an end of said pitch comprises the steps of:

predicting said end of said pitch;

identifying a set of end of line points within a window near said predicted end of said pitch; and identifying a particular end of line point within said window.

22. A method according to claim 19, wherein said step of determining a speed of a bat during a swing attempting to hit said ball comprises the steps of:

identifying processed data representing one or more flashes of said bat;

determining one or more sets of said processed data in time proximity to said flashes; and determining a speed based on said one or more sets of said processed data.

23. A method for determining a speed of a bat during a swing, comprising the steps of:

accessing radar data for multiple moving objects based on multiple radar units, said bat being one of said multiple moving objects;

identifying a subset of said radar data that pertains to said bat during said swing; and determining said speed of said bat during said swing based on said subset of said radar data.

24. A method according to claim 23, further comprising the steps of:

receiving information from said radar units; and processing said information using a frequency-time resolution algorithm, said radar data is a result of said frequency-time resolution algorithm.

25. A method according to claim 24, further comprising the step of:

detecting a flight of a ball using at least a subset of said radar data, said step of determining is performed in response to said step of detecting a flight.

26. A method according to claim 23, wherein:

said steps of identifying and determining are performed automatically.

27. A method according to claim 25, further comprising the step of:

determining a velocity vector for said ball.

28. A method according to claim 25, further comprising the step of:

determining a trajectory of a path of said ball.

29. One or more processor readable storage devices for storing processor readable code, said processor readable code for programming a processor to perform a method comprising the steps of:

receiving information from multiple radar units;

processing said information using a frequency-time resolution algorithm;

accessing radar data for two or more moving objects, said radar data is a result of said frequency-time resolution algorithm;

identifying a subset of said radar data that pertains to a first object of said two or more moving objects, said first object is a bat; and determining a speed of said first object using said subset of said radar data, said step of determining a speed includes determining a speed of said bat during a swing.

30. One or more processor readable storage devices according to claim 29, wherein said method further comprises the steps of:

predicting an end of a pitch of a ball;

identifying a set of end of line points within a window near said predicted end of said pitch; and identifying a particular end of line point within said window, said particular end of line point being said end of said pitch, said step of determining a speed of said object is based on said end of said pitch.

31. One or more processor readable storage devices according to claim 30, wherein:

said step of determining said speed includes determining a speed at a moment when said bat hits a ball.

32. One or more processor readable storage for storing processor readable code, said processor readable code for programming a processor to perform a method comprising the steps of:

accessing radar data for two or more moving objects;

identifying a subset of said radar data that pertains to a first object of said two or more moving objects, said first object is a bat; and determining a speed of said first object using said subset of said radar data, said step of determining a speed includes calculating multiple speed values for said bat and choosing a maximum speed from said calculated multiple speed values.

33. One or more processor readable storage devices according to claim 29, wherein said method further comprises the step of:

identifying a flight of a ball using at least a subset of said radar data, said step of determining is performed based on results of said step of identifying a flight.

34. One or more processor readable storage devices according to claim 33, wherein said method further includes the step of:

determining a three dimensional velocity vector for said ball.

35. One or more processor readable storage for storing processor readable code, said processor readable code for programming a processor to perform a method comprising the steps of:

accessing radar data for two or more moving objects;

identifying a subset of said radar data that pertains to a first object of said two or more moving objects, said first object is a bat, said bat has a tip; and determining a speed of said first object using said subset of said radar data, said step of determining a speed includes determining a speed of said tip.

36. One or more processor readable storage devices according to claim 29, wherein:
said step of determining a speed, includes identifying one or more flashes.

37. An apparatus for determining speed, comprising:
a first radar unit;
a second radar unit; and
a processor in communication with said first radar unit and said second radar unit, said processor programmed to perform a method comprising the steps of:
receiving data from said first radar unit and said second radar unit, said data pertaining to two or more moving objects;
identifying a subset of said data that pertains to a first object of said two or more moving objects, said first object is a bat; and
determining a speed of said first object using said subset of said data, said step of determining includes calculating a speed of said bat during a swing.

38. An apparatus according to claim 37, wherein said method further comprises the steps of:
predicting an end of a pitch of a ball;
identifying a set of end of line points within a window near said predicted end of said pitch; and
identifying a particular end of line point within said window, said particular end of line point being said end of said pitch, said step of determining a speed of said bat is based on said end of said pitch.

39. An apparatus according to claim 37, further including a data acquisition board in communication with said processor and said radar units, said data acquisition board being local to said processor.

40. An apparatus according to claim 37, further including:
a third radar unit in communication with said processor;
a fourth radar unit in communication with said processor;
a fifth radar unit in communication with said processor, said first, second, third, fourth and fifth radar units being mounted behind and pointing at a batter;
a sixth radar unit in communication with said processor, said first, second, third, fourth and fifth radar units being positioned at a first level and said sixth radar unit is positioned at a second level, said second level is above said first level.

41. An apparatus according to claim 40, wherein said method further comprises the step of:
identifying a flight of a ball using at least a subset of said data, said step of determining is performed based on results of said step of identifying a fight.

42. An apparatus according to claim 37, wherein:
said step of determining a speed includes identifying one or more bat flashes.

43. An apparatus according to claim 37, wherein:
said bat has a tip; and
said processor determines said speed by determining a speed of said tip.

44. A method of determining a speed of a bat during a swing, comprising the steps of:
accessing radar data based on a set of one or more radars units; and
determining said speed of said bat during said swing based on said radar data.

45. A method according to claim 44, wherein:
said one or more radar units include at least two radar units.

46. A method according to claim 44, wherein:
said radar data includes motion data for multiple moving objects; and
said step of determining includes identifying first data from said radar data that pertains to said bat during said swing.

47. A method according to claim 44, further including the steps of:
receiving information from said radar units; and
processing said information using a frequency-time resolution algorithm, said radar data is a result of said frequency-time resolution algorithm.

48. A method according to claim 44, wherein:
said steps of accessing and determining are performed automatically.

49. A method according to claim 44, further including the step of:
detecting a start of a pitch, said step of determining is performed in response to said step of detecting a start of a pitch.

50. A method according to claim 49, wherein:
said step of detecting a start of a pitch is performed using said radar data.

51. A method according to claim 44, wherein said step of determining comprises the steps of:
identifying data representing one or more flashes of said bat;
determining one or more sets of said radar data in time proximity to said flashes; and
determining a speed based on said one or more sets of said radar data.

52. A method according to claim 44, wherein:
said step of determining includes determining speed information at multiple times and determining a maximum speed from said speed information.

53. A method according to claim 23, wherein:
said step of identifying a subset of data includes identifying a bat flash.

54. A method according to claim 23, wherein:
said bat has a tip; and
said step of determining said speed includes calculating a speed of said tip.

55. A method according to claim 23, wherein:
said step of determining said speed includes calculating multiple speed values and choosing a maximum speed.

56. A method according to claim 23, wherein:
said step of determining said speed includes determining a speed at a moment when said bat hits a ball.

57. A method according to claim 23, further comprising the steps of:
predicting an end of a pitch of a ball;
identifying a set of end of line points within a window near said predicted end of said pitch; and
identifying a particular end of line point within said window, said particular end of line point being said end of said pitch, said step of determining said speed of said bat is based on said end of said pitch.

58. A method according to claim 23, wherein said step of determining comprises the steps of:
identifying radar data representing one or more flashes of said bat;
determining one or more sets of radar data in time proximity to said flashes; and determining a speed based on said one or more sets of radar data.

59. One or more processor readable storage devices having processor readable code embodied on said processor readable storage devices, said processor readable code for programming one or more processors to perform a method of determining a speed of a bat during a swing, the method comprising the steps of:

accessing radar data based on a set of one or more radars units; and determining said speed of said bat during said swing based on said radar data.

60. One or more processor readable storage devices according to claim 59, wherein:

said radar data includes motion data for multiple moving objects; and said step of determining includes identifying first data from said radar data that pertains to said bat during said swing.

61. One or more processor readable storage devices according to claim 59, wherein:

said steps of accessing and determining are performed automatically.

62. One or more processor readable storage devices according to claim 59, wherein said method further includes the step of:

automatically detecting an occurrence of a ball traveling toward said bat, said step of determining is performed in response to said step of automatically detecting.

63. One or more processor readable storage devices according to claim 59, wherein:

said step of determining includes identifying a subset of said radar data representing one or more flashes of said bat, said step of determining uses said subset of said radar data to determine said speed of said bat during said swing.

64. An apparatus for determining speed of a bat during a swing, comprising:

one or more radar units; and a processor in communication with said one or more radar units, said processor programmed to perform a method comprising the steps of:

accessing radar data based on said one or more radars units; and determining said speed of said bat during said swing based on said radar data.

65. An apparatus according to claim 64, wherein:

said radar data includes motion data for multiple moving objects; and said step of determining includes identifying first data from said radar data that pertains to said bat during said swing.

66. An apparatus according to claim 64, wherein:

said steps of accessing and determining are performed automatically.

67. An apparatus according to claim 64, wherein said method further includes the step of:

automatically detecting an occurrence of a ball traveling toward said bat, said step of determining is performed in response to said step of automatically detecting.

68. An apparatus according to claim 64, wherein:

said step of determining includes identifying a subset of said radar data representing one or more flashes of said bat, said step of determining uses said subset of said radar data to determine said speed of said bat during said swing.

69. An apparatus according to claim 64, wherein:

said one or more radar units includes at least three radar units.

* * * * *